United States Patent [19]

Faroudja

[11] Patent Number: 5,025,312
[45] Date of Patent: Jun. 18, 1991

[54] MOTION-ADAPTIVE VIDEO NOISE REDUCTION SYSTEM USING RECIRCULATION AND CORING

[76] Inventor: Yves C. Faroudja, 26595 Anacapa Dr., Los Altos, Calif. 94022

[21] Appl. No.: 503,313

[22] Filed: Mar. 30, 1990

[51] Int. Cl.$^5$ .................. H04N 9/64; H04N 5/713
[52] U.S. Cl. .................................. 358/36; 358/167
[58] Field of Search .............. 358/36, 167, 37, 166

[56] References Cited

U.S. PATENT DOCUMENTS

| | | | |
|---|---|---|---|
| 4,090,221 | 5/1978 | Connor | 358/166 |
| 4,107,736 | 8/1978 | Lowry et al. | 358/36 |
| 4,361,853 | 11/1982 | Remy et al. | 358/167 |
| 4,679,086 | 7/1987 | May | 358/167 |

FOREIGN PATENT DOCUMENTS 0241854 10/1987 European Pat. Off. .

*Primary Examiner*—James J. Groody
*Assistant Examiner*—Safet Metjaail
*Attorney, Agent, or Firm*—David B. Harrison

[57] ABSTRACT

A method and apparatus are provided for reducing transmission path noise within a video signal so as to provide a noise reduced picture image upon a display. The method comprises the steps of:

a. extracting low level picture details and the transmission path noise from the video signal, b. recirculating a fractional component of the extracted low level picture details and the transmission path noise, c. combining the recirculated fractional component with the extracted low level picture details and the transmission path noise to cancel the extracted low level picture details and thereby separate the transmission path noise, d. subtracting the separated transmission path noise from the video signal in the absence of motion of the picture image thereof in order to noise reduce non-moving portions of the picture image of the video signal, and e. selectively coring only the moving portions of the picture image of the video signal to noise reduce those moving portions, whereby noise is reduced in non-moving portions of the picture image by signal recirculation and is reduced in moving portions of the picture image by coring.

31 Claims, 4 Drawing Sheets

MOTION-ADAPTIVE VIDEO NOISE REDUCTION SYSTEM USING RECIRCULATION AND CORING

FIELD OF THE INVENTION

The present invention relates to signal processing methods and apparatus for video reception and display apparatus. More particularly, the present invention relates to improved interdimensional video noise reduction methods and apparatus for a television system.

BACKGROUND OF THE INVENTION

Television receivers are predominantly located in the home, and this fact limits the practical size of most receivers, since they can be sized no greater than may conveniently pass through an accessway, such as the front or rear door of the home. Within such modern television receivers, signal processing designs and systems have been implemented which are capable of providing a defect-free, high resolution picture image on the display screen within a reasonable viewing angle, such as 45°. With these known techniques which include adaptive comb filter separation of chrominance and luminance, video transition crispening and line doubling with adaptive interpolation, a conventionally formatted television picture signal (e.g. NTSC or PAL) will be displayed without any apparent loss or lack of resolution or artifacts other than random noise.

Thus, random noise becomes the limiting factor in picture quality. With comb filter signal processes and crispening processes, random noise takes on a certain coherence or lack of randomness. In these processes signal components in the vertical and horizontal direction are favored over components along 45° diagonals. This favoritism leads to a coherence which is manifested as the transformation of a randomly shaped noise blob or impulse into a box-like image having squared dimensional characteristics in the picture display. While the resultant box-like image resembles film grain, it is not such, and it can prove to be annoying when it reaches the level of conscious perception on the part of the viewer.

A number of encode-decode noise reduction processes have been proposed wherein preemphasis has been added to low picture level details at the transmit end of the transmission path in order to enable more ready separation of such low level details from transmission path added noise at the receiver. One approach is described in the present inventor's U.S. Pat. No. 4,837,611 entitled "Wideband NTSC-Compatible Transmission System with Noise Reduction Processing" which employs two adjacent television channels, and which is particularly well suited to cable television. Another approach is described in the present inventor's U.S. Pat. No. 4,918,515 entitled "Compatible Television Transmission System with Separate Preemphasis Path Within a Single Channel". Each of these two exemplary approaches to noise reduction requires a modification of the conventional broadcast television signal format standards for operability, a subject involving both technical and political issues.

Thus, despite the innovations identified above, a need has remained for a more universally acceptable noise reduction system which requires no modification of the existing television signal format standards and which may be used in all television receivers. That is to say, the noise reduction system is single ended, with all of the processes occurring at the television receiver.

Single ended noise reduction techniques are not new. The present inventor has been active in this field, as shown by his prior U.S. Pat. Nos. 4,443,817; 4,670,775; and 4,672,429, for example. However, these prior approaches do not fully intermingle or mesh together the information available in the horizontal, vertical and temporal domains in order to achieve a more effective single ended noise reduction system.

There are two fundamental approaches to noise reduction at a television receiver. The first approach is known as "coring". The second approach employs temporal recirculation techniques. Each has its own advantages and drawbacks.

Coring processes provide the selective insertion of a low pass filter structure for low amplitude video transitions, whether they are horizontal, vertical or temporal. Coring has the advantage of relative simplicity and is usually carried out in the horizontal domain. More complex coring systems have been proposed for coring in the vertical and/or temporal domains, and for adaptive adjustment of the coring threshold, based upon motion content of the picture, for example.

Irrespective of the implementation details, the coring process operates upon only one characteristic of noise: its low amplitude; and, coring processing necessarily results in a lower frequency response for small amplitude signals in the picture display. The appearance of a cored picture image is unpleasant aesthetically. What is otherwise a grainy but high resolution picture becomes a grainless but very soft picture image as to low level details. For example, a picture image of a bookcase may have very sharp features relating to the horizontal and vertical edges of the bookcase and its shelves, whether or not coring is being done, since the edges are large transition level signals. However, without coring, the somewhat grainy picture will enable the viewer to read the titles on the books on the bookshelves, while when coring is inserted, the book titles become completely blurred and undecipherable by the viewer.

The temporal recirculation approach to noise reduction operates upon the principle of spreading out a noise impulse over a number of successive picture frames, thereby to reduce or minimize its visual impact. However, the recirculation technique is necessarily limited to stationary picture images. For evident reasons, recirculation of the picture image breaks down in the presence of motion. The amount of blurriness to be tolerated has generally been considered to be a function of the noise level. It is not uncommon to find television signal processing appliances, such as VCRs, having a manual control for selecting a recirculation threshold at 3 dB, 6 dB, or 12 dB, for example. The user is then free to select a compromise between blurring and noise, generally in function of the actual noise level then present.

Thus, a hitherto unsolved need has existed for a reception-end noise reduction system which more effectively reduces transmission path noise in a television picture signal.

SUMMARY OF THE INVENTION WITH OBJECTS

A general object of the present invention is to provide a reception-end video noise reduction system which takes advantage of the best features of coring and time domain recirculation on an adaptive basis, depending upon picture content and characteristics.

A more specific object of the present invention is to provide a reception-end video noise reduction system which adaptively employs time domain recirculation techniques to eliminate transmission path noise from stationary picture images and employs coring techniques to eliminate transmission path noise from picture images in motion.

Another specific object of the present invention is to quantify noise level in a non-moving, quiescent portion of a picture image and use the quantified noise level to control the level of noise reduction upon a moving portion of the picture image.

Yet another specific object of the present invention is to provide an automatic control on a pixel by pixel basis for controlling coring level within a picture image, and to apply controlled level coring only to moving portions of a picture image, thereby limiting coring to an amount which is appropriate to actual noise level.

Yet one more specific object of the present invention is to provide a noise reduction method which may be applied to luminance and chrominance components of a quadrature modulated subcarrier color television system in a manner in which motion controls derived from luminance and chrominance may be combined to improve noise reduction in the resultant picture image display.

In accordance with the principles of the present invention, a method is provided for reducing transmission path noise within a video signal so as to provide a noise reduced picture image upon a display. The method comprises the steps of:

a. extracting low level picture details and the transmission path noise from the video signal,
b. recirculating a fractional component of the extracted low level picture details and the transmission path noise,
c. combining the recirculated fractional component with the extracted low level picture details and the transmission path noise to cancel the extracted low level picture details and thereby separate the transmission path noise,
d. subtracting the separated transmission path noise from the video signal in the absence of motion of the picture image thereof in order to noise reduce non-moving portions of the picture image of the video signal, and
e. selectively coring only the moving portions of the picture image of the video signal to noise reduce those moving portions, whereby noise is reduced in non-moving portions of the picture image by signal recirculation and is reduced in moving portions of the picture image by coring.

A facet of this aspect of the invention includes the further steps of detecting motion in the picture image of the video signal, generating therefrom a motion control signal from the picture image of the video signal, and controlling selectively the recirculation step and the coring step with the motion control signal.

A related facet comprises the further steps of processing the separated transmission path noise into a noise control signal and controlling the coring step as a function of the presence of the noise control signal and the magnitude of the motion control signal.

In another facet of this aspect of the invention the step of generating the motion control signal comprises the step of putting out a function of detected motion above a predetermined threshold to a predetermined maximum amplitude value and thereafter limiting the motion control signal to the maximum amplitude value. Preferably, the predetermined threshold is set at about 5 to 15 IRE units, and the maximum amplitude value is approximately 40 IRE units.

In still another facet of this aspect of the invention, the video signal comprises in one noise reduction path a luminance component of a quadrature modulated subcarrier color television signal which preferably, but not necessarily, has been separated from the quadrature modulated subcarrier color television signal by the step of comb filter signal separation processing and/or comprises in another noise reduction path a chrominance component also preferably but not necessarily separated by comb filter signal separation processing.

In another facet of this aspect of the invention, the step of coring in the moving portions of the picture image is made proportional to noise level as measured in non-moving portions of the picture image.

In still another aspect of the invention, the noise reduction method is carried out in plural paths simultaneously upon luminance and chrominance components of a quadrature modulated subcarrier color television signal.

As a facet of this aspect of the invention the motion control signal in a luminance component path and the motion control signal in a chrominance component path are combined to obtain a single motion control signal for controlling recirculation and coring steps of the method in each path.

In another aspect of the present invention, the chrominance component of the quadrature modulated subcarrier color television signal is demodulated into plural baseband components and the noise reduction method is simultaneously carried out for each said component.

Apparatus implementing the foregoing methods, steps, aspects, facets and features of the present invention is also an aspect hereof.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
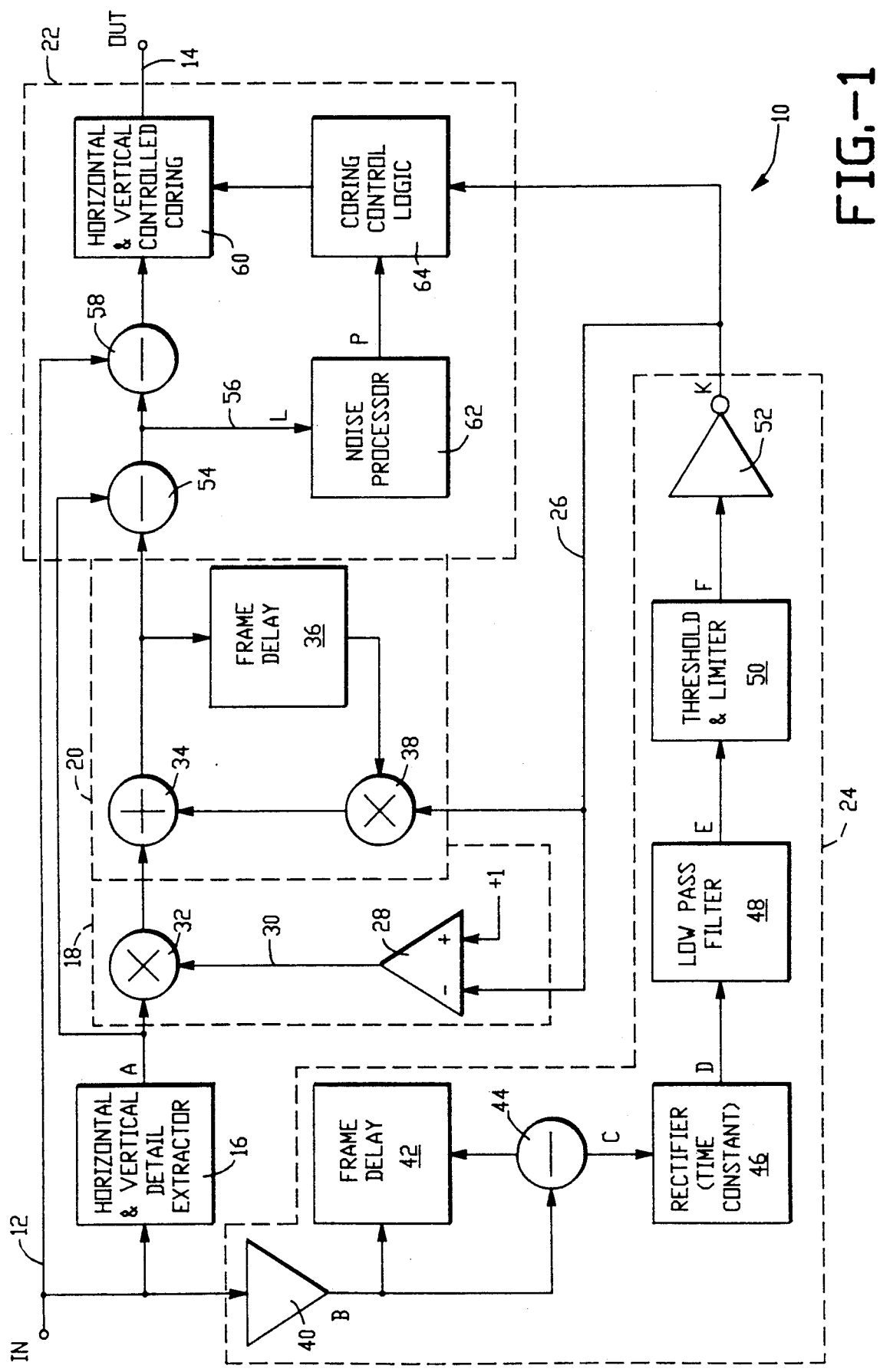
FIG. 1 is an overall system block diagram of a video noise reduction system incorporating the principles of the present invention.

A video noise reduction system 10 is shown in FIG. 1. The FIG. 1 system is depicted as a monochrome system, for simplicity. For color television systems, the system 10 may be incorporated within a luminance path; and, it may equally effectively be incorporated within a chrominance path. Ideally, luminance path and chrominance path systems would be included, and the controls generated within each system would be used to control or influence the noise reduction processing of the other. This is so, because computer generated images are encountered with increasing frequency. For example, with computer generated images, it is common practice to change a color (hue) without a concomitant change in brightness (luminance).

The system 10 is located within a signal processing path of e.g. a television receiver which may include a conventional raster scanned CRT display, for example, or the playback section of a VCR; and, it is presupposed that upstream processes have effectively separated chrominance and luminance, as by comb filter separation techniques, see for example the inventor's U.S. Pat. No. 4,864,389, entitled "Comb Filter Method and Apparatus for Chrominance and Luminance Separation in Quadrature Modulated Color Subcarrier Television Systems", the disclosure of which is hereby incorporated by reference.

The system 10 of FIG. 1 includes a video signal input 12. If the input signal is luminance, then no chrominance is present in any effective amount. Conversely, if the input signal is baseband chrominance, then no luminance is present in any effective amount. An output 14 provides a video signal in which transmission path random noise artifacts have been substantially removed.

The system 10 includes a horizontal and vertical detail extractor circuit 16, a recirculation gain control circuit 18, a frame rate noise recirculation circuit 20, and a multi-dimensional coring circuit 22. A motion detector and control generator circuit 24 generates a motion control signal K and puts it out over a line 26 for controlling in part the operation of the gain control circuit 18, recirculation circuit 20 and coring circuit 22, as will be explained hereinafter in greater detail.

Figure 2:
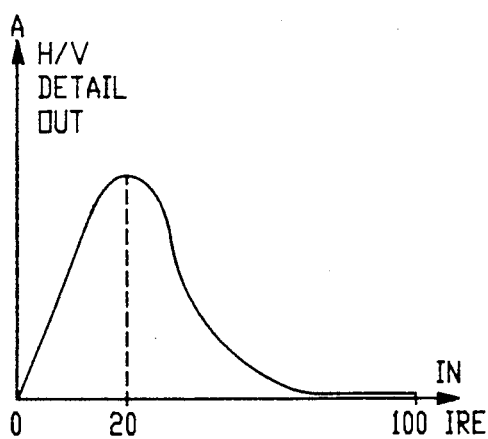
FIG. 2 is a graph of a transfer characteristic of a horizontal and vertical detail extractor of the FIG. 1 noise reduction system.

The horizontal and vertical detail extractor circuit 16 operates to extract horizontal and vertical picture details and noise from the overall video signal appearing at the input line 12. The transfer function of the circuit 16 is graphed in FIG. 2, and represents a gain characteristic which is peaked at about 20 IRE units of amplitude and which decays rather sharply on each side of this amplitude point. Thus, the circuit 16 is particularly responsive to low level picture details (and noise) and is not responsive to high level picture transitions above about 40 IRE units. The circuit 16 is effective in the initial process of extraction of the random noise by discriminating upon the characteristic of noise in that it is of low amplitude level. An output line from the extractor circuit 16 comprises low level picture detail information and transmission path noise. (Details of circuitry implementing the detail extractor circuit 16 are given in the inventor's prior U.S. Pat. Nos. 4,262,304 and/or 4,847,681, the disclosures of which are hereby incorporated herein by reference.)

Figure 5:
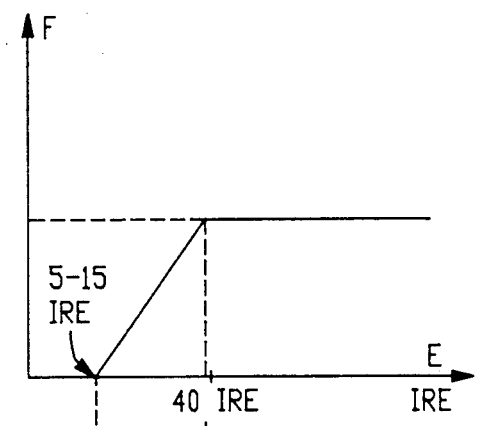
FIG. 5 comprises two related graphs showing generation of a motion control signal which is put out by the motion control circuit of the FIG. 1 noise reduction system.
Figure 5:
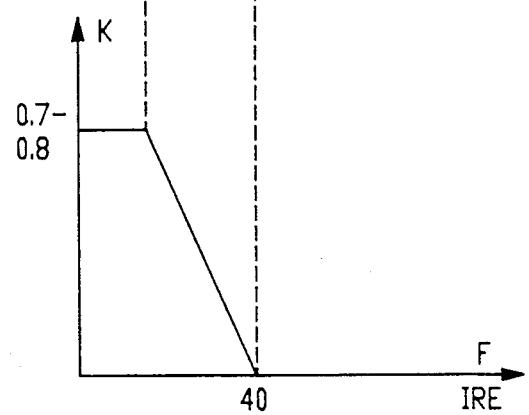

The recirculation gain control circuit 18 includes a subtractor amplifier 28 which subtracts the motion control K from unity to provide a 1-K multiplier signal on a line 30 to a multiplier 32. The multiplier 32 multiplies the detail and noise signal A by the 1-K multiplier signal to compensate for recirculation gain. The K motion control signal is graphed in the lower graph of FIG. 5, and its inverse, 1-K, is readily derived by subtraction.

The recirculation circuit 20 includes a summing junction 34, frame delay 36 and multiplier 38 which multiplies the frame delayed detail and noise component leaving the frame delay 36 by the motion control signal K. The fractional product is then added back to the path at the adder 34 to achieve recirculation in a manner explained in greater detail in the inventor's previously referenced prior U.S. Pat. No. 4,443,817, incorporated herein by reference.

Since the recirculation circuit 20 is controlled by the motion control signal K, the output of the circuit 20 leading into the coring circuit 22 provides low level picture details and reduced noise when there is no motion, and provides details plus unmodified noise in the presence of motion. In other words, recirculation is effectively stopped if the level of the motion control signal K reaches zero. With no motion, the motion control signal K lies in a range of 0.7 to 0.8, as shown on the ordinate of FIG. 5, lower graph. With motion, the value of K decreases progressively to zero, reaching zero at about 40 IRE units of motion amplitude as detected by the motion detector circuit 24. The transition from 0.7 to 0.8 IRE units may be a smooth curve, a linear curve, or a series of progressive steps characteristic of a limited range (e.g. 4 bit) of digital control values. A resolution of four bits (fifteen steps) has been found to provide an entirely adequate dynamic range for the motion control signal K.

The placement of the recirculation gain control circuit 18 in front of the recirculation circuit 20 as shown in FIG. 1 is preferred only in the sense that with a digital implementation of the system 10, quantization noise is less. Conceptually, the gain control circuit 18 could follow the recirculation circuit 20 with equal effectiveness.

The motion detector and control generator circuit 24 includes a non-linear amplifier 40, a frame delay 42, a subtractor circuit 44, a rectifier circuit 46, a low pass filter 48, a threshold and limiter circuit 50 and an inverting amplifier 52, all connected in the order shown in FIG. 1.

Figure 4:
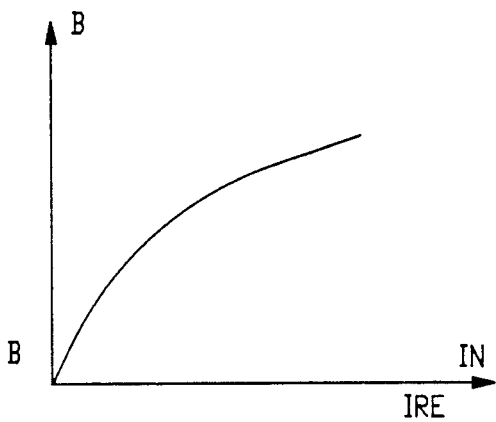
FIG. 4 comprises five graphs of signals within a motion control circuit of the FIG. 1 noise reduction system.
Figure 4:
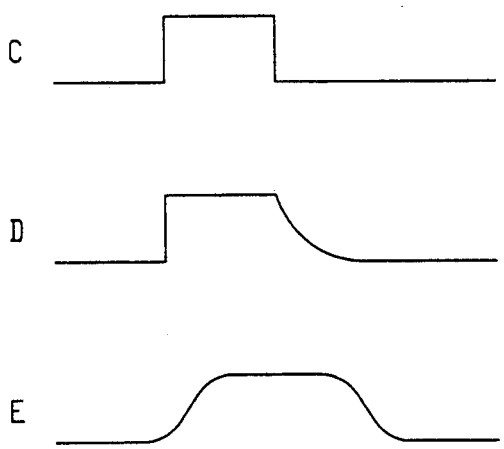
Figure 4:
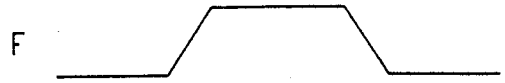

The non-linear amplifier 40 has a transfer function which is graphed in FIG. 4, graph B which illustrates that the amplifier 40 has a higher gain characteristic and puts out a relatively higher level for lower level incoming signals than for higher level incoming signals. The output B from the amplifier 40 leads through a frame delay 42 to a subtractor circuit 44, and it also leads directly to the subtractor circuit 44, so that frame-successive levels from the amplifier 40 may be compared as to amplitude in the subtractor circuit 44. The Output C of the subtractor circuit is graphed in graph C of FIG. 4, and it leads to a rectifier and threshold circuit 46.

The rectifier circuit 46 removes the sign resulting from the subtraction process of the circuit 44 and and favors the detection of motion by having a time constant, shown in graph D of FIG. 4 as a decay following the end of an amplitude value received from the subtractor 40. Thus, the output signal D from the rectifier 46 goes very quickly to a level indicative of the absolute value of the difference from the subtractor 44 which indicates the presence of motion, but goes very slowly back to the non-motion condition at the falling edge of the output from the subtractor.

The low pass filter 48 smooths out the signal D put out by the rectifier 46 and results in a signal E which is longer in duration than the incoming signal D, as graphed in graph E of FIG. 4. Also, the transition from no motion to motion, and from motion to no motion is made smoother and continuous by the low pass filter 48.

The threshold and limiter circuit 50 functions to ignore amplitude values from the low pass filter 48 which are below a predetermined level in the range of approximately 5 to 15 IRE units and hard limits the control signal to a fixed value when the incoming signal reaches a predetermined level, such as 40 IRE units for example. This transfer characteristic is graphed in the upper graph of FIG. 5.

With regard to the motion detector and control generator circuit 24 it should be understood that the duration of the motion pulse graphed in graphs C, D, E and F of FIG. 4 is a function of the speed of the motion, whereas the amplitude of the motion pulse is a function of the contrast level of the image object in motion in comparison with the stationary background. The amplitude (contrast) is not particularly useful for noise reduction, and so the limiter circuit 50 limits the control amplitude as previously explained.

The inverter amplifier 52 functions in a non-linear fashion to invert the signal F put out by the threshold and limiter circuit in order to arrive at the motion control signal K. As can be seen in the FIG. 5 lower graph, when there is no output from the threshold and limiter circuit 50, the motion control signal K has an amplitude value of between e.g. 0.7 and 0.8 IRE units. The amplitude of K begins to fall when the pulse C reaches the predetermined threshold amplitude (e.g 5-15 IRE units), and falls sharply to zero at about 40 IRE units of the amplitude-limited D pulse. While a linear slope is shown in the bottom graph of FIG. 5 for K, it will be understood that the progression may be a quantized staircase within a four bit resolution, or a non-linear progression may occur. From the foregoing discussion, the reader will appreciate that a very conservative motion detection strategy has been implemented within the motion detection and control circuit 26. That is to say, whenever there is motion at a perceptible level in the picture image display, the motion control signal K will indicate the presence and duration of that motion. If there is any doubt or ambiguity, motion is presumed and noise reduction via recirculation is thereupon diminished.

The multi-dimensional coring circuit 22 acts to reduce noise whenever the temporal recirculation circuit 20 is not acting. The circuit includes a subtractor 54 which subtracts the detail and transmission path noise signal A from the signal put out by the temporal domain recirculator 20. When there is no motion, a signal L on an output line 56 comprises random, transmission path noise. When motion is present, the output signal from the subtractor 54 is zero.

The subtractor 58 subtracts the output signal L from the subtractor 54 from the baseband video signal on the input line 12 with the following consequence: When there is no motion in the picture, the output of the subtractor is baseband video in which the transmission path noise has been subtracted. When there is motion, the baseband signal put out from the subtractor 58 includes the transmission path noise. This is temporal noise, i.e., noise from frame to frame which is separated not only from the higher amplitude signals but also from the low amplitude picture details.

Since temporal recirculation unacceptably causes blurring of the picture image in motion, it is discontinued for picture components in motion, leaving such components noisy. Coring, while unacceptable for small, stationary picture details, is acceptable to the viewer, and the loss of resolution quite closely fits the loss of resolution inherently a part of the eye-brain perception/integration process of the viewer. Thus, from the viewer's viewpoint, coring of the moving part of the picture only, results in the removal of unwanted noise artifacts with no apparent loss in resolution.

In order to apply coring only to picture elements in motion, a second control must be generated which indicates the presence of noise. To this end, the noise signal L on the line 56 enters a noise processor 62 which puts out a logical true signal when the noise-no motion signal L is present and a logical false signal when signal L is not present. The output signal P from the noise processor 62 is then applied as one input to a coring control logic circuit 64 which receives the motion control signal K as a second logical input.

The coring control logic circuit 64 controls operation of a coring circuit 60, in accordance with the following truth table:

| average noise level high motion high | Threshold is high |
|---|---|
| average noise level high motion low | Threshold is low |
| average noise level low high motion | No threshold |
| average noise level low low motion | No threshold |

Figure 3:
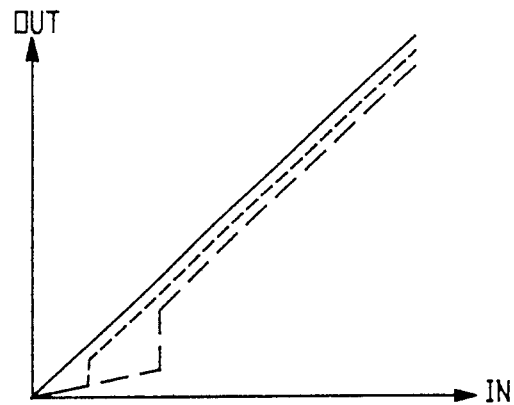
FIG. 3 is graph of transfer characteristics of a horizontal and vertical controlled coring circuit of the FIG. 1 noise reduction system.

From this table it is apparent that the coring process carried out by the circuit 60 is active only when the average noise level is high and the motion level is high. The coring characteristics are graphed in FIG. 3. Therein, the solid line illustrates no coring in the condition when there is no noise, with or without motion in the picture. The dotted line illustrates the coring characteristic for low noise and low coring. The dashed line indicates high noise and motion resulting in a high level of coring.

Figure 6:
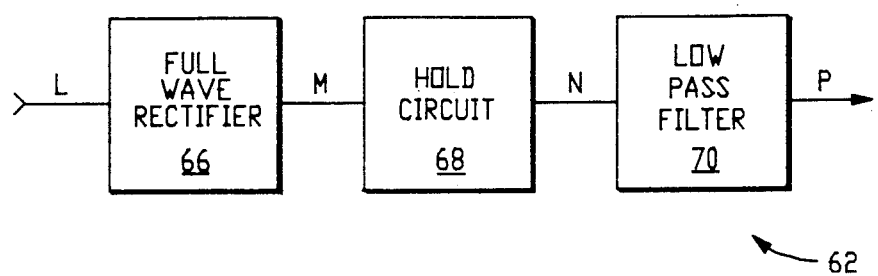
FIG. 6 is a more detailed block diagram of a noise processor circuit of the FIG. 1 noise reduction system.
Figure 7:
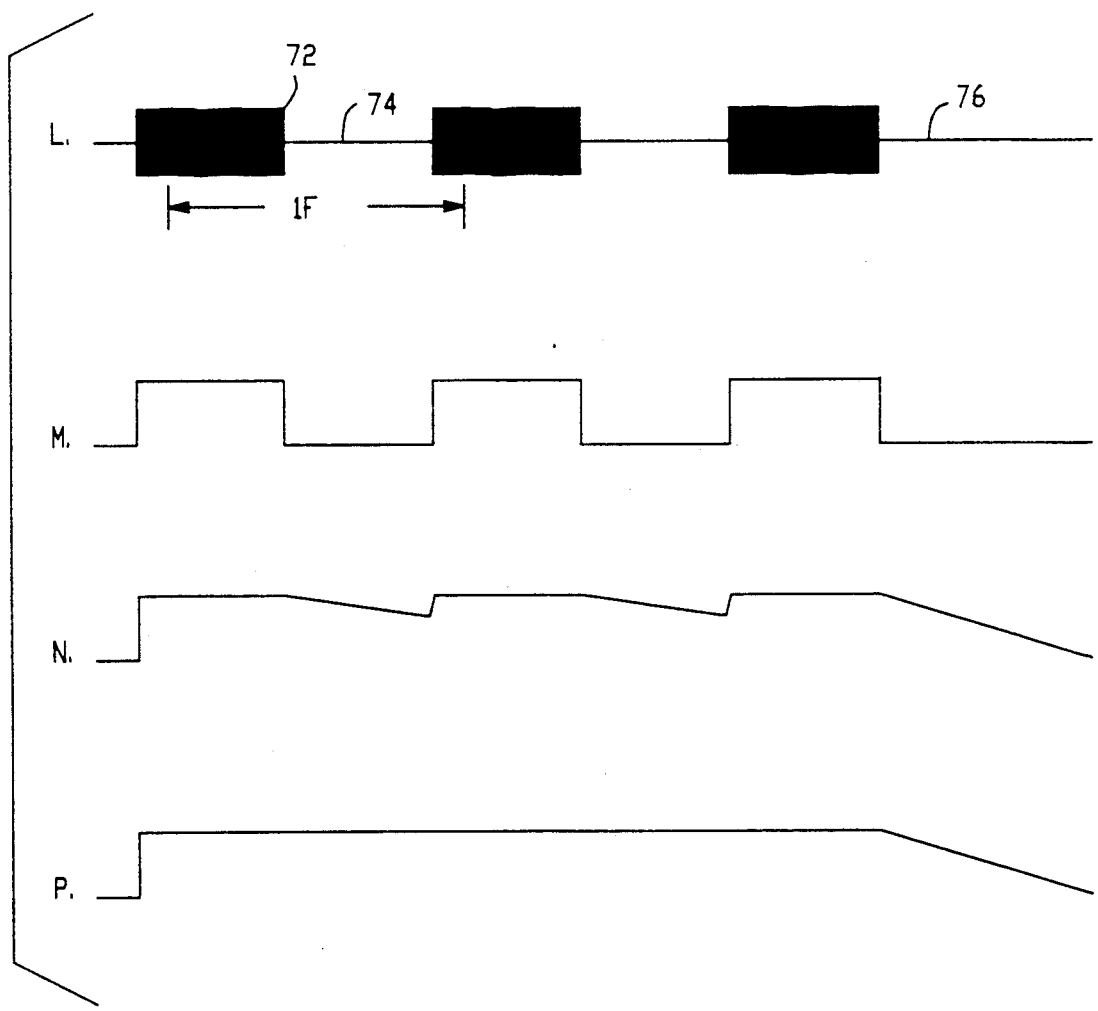
FIG. 7 comprises four graphs of signals within the noise processor circuit of FIG. 6.

Further details of the noise processor 62 are provided in FIG. 6. As shown by FIG. 6 the noise processor 62 includes a full wave rectifier 66, a hold circuit 68 and a low pass filter 70, arranged as shown. As shown in FIG. 7, graph L, the noise signal L includes a burst 72 which is noise in a still area of the picture image without motion, and a quiescent level 74 which denotes a picture area which is in motion. The level 74 does not include signal and noise, since the two inputs of subtractor 54 are equal when motion is present and recirculation is inhibited.

The full wave rectifier 66 translates the noise burst 72 into an absolute value as graphed at graph M of FIG. 7. The hold circuit 68 then applies a long time constant (e.g. several seconds) to the signal M to yield a signal N.

The low pass filter 70 then effectively removes any discontinuities from the held signal N and achieves the analog signal P which is supplied to the coring control circuit 64.

The transmission path noise is typically present in a constant amount throughout the picture image, including those portions that are still and those portions that are in motion. The signal P is actually representative of the noise level in areas that are not in motion. Because of the holding characteristics of the circuit 68, this level measurement P is available at the same time (area 74) as motion, and is available to introduce coring by the coring circuit 60, when and only when motion is present. Coring control logic circuit 64 combines in an analog fashion the motion information on the motion control line 26 and the noise level P derived from the quiescent areas of the picture image in order to make sure that:
coring is proportional to noise level in non-motion areas of the picture image and
coring is made effective only for moving areas.

In this way when there is no motion, time domain recirculation reduces noise without detail losses and without coring. When there is motion, an amount of coring directly related to noise level in surrounding, quiescent (non-moving) portions of the picture image is applied for noise reduction. Loss of details is therefore limited only to moving portions of the picture image, and is applied to those moving portions in an amount which is limited to the amount necessary on account of measured noise level.

Since coring is adaptively available for noise reduction of the baseband signal at the input 12, the level of noise reduction achieved by temporal recirculation can be made to be more gentle and less pronounced at the output of the second subtractor 58. All told, both recirculation and coring work harmoniously in an interleaved manner in function of noise level and frame-to-frame motion characteristics and content of the baseband picture signal.

Those skilled in the art will appreciate that the various paths depicted in FIG. 1 will require delay matching, which is very easily achieved in the digital domain by use of clocked shift registers, for example. Also, as noted, the descriptions herein of a "baseband" signal apply with like force to luminance and chrominance components of a color television system. It is also fairly evident to those skilled in the art that luminance motion and noise level control signals from a luminance signal noise reduction system 10' may be combined with chroma motion and noise level control signals from a chrominance signal noise reduction system 10" in an interrelated manner to reduce more efficiently chroma noise, luminance noise, or both.

Figure 8:
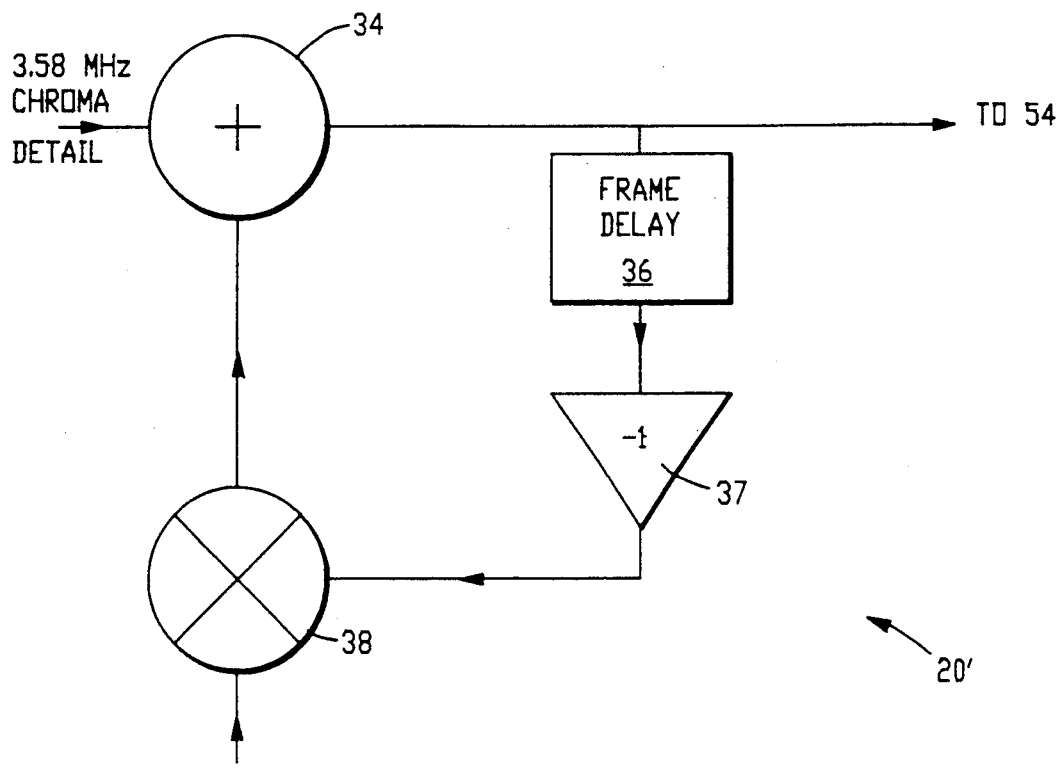
FIG. 8 is a block diagram of a modified recirculation circuit enabling recirculation of undemodulated chroma components in the NTSC signal format, for example.

Furthermore, if chrominance is noise reduced under its quadrature subcarrier modulation form, in the NTSC format it is necessary to invert the sign of the frame delayed signal from the frame delay 36 and multiplier 38, so that the inputs at the adder 34 are added in phase with each other. This is so, as the subcarrier phase is inverted on a frame-to-frame basis in the NTSC format. FIG. 8 depicts a modified recirculation circuit 20' for NTSC chrominance which differs structurally from the FIG. 1 circuit 20 by including an inverter 37.

Figure 9:
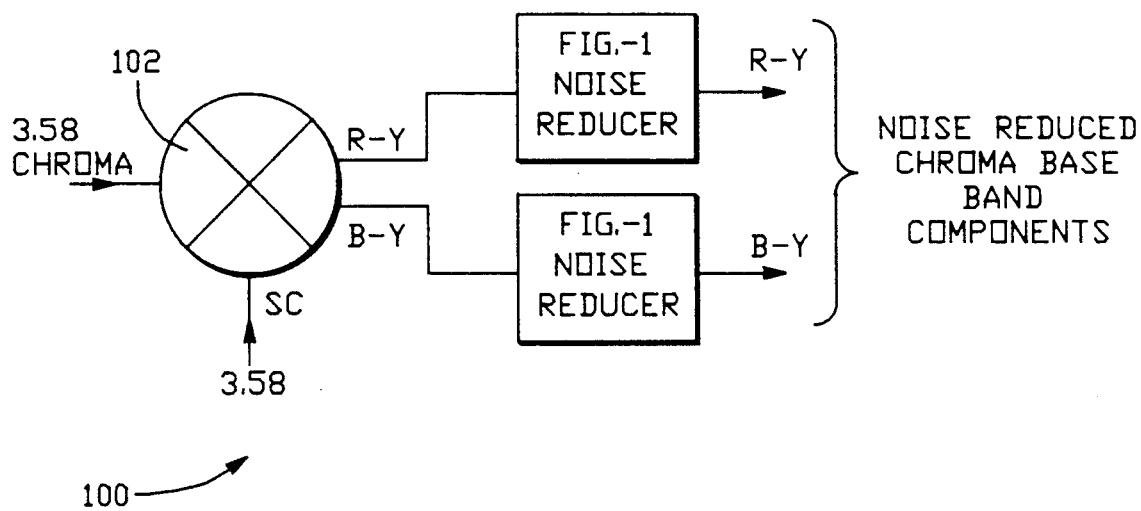
FIG. 9 is a system block diagram showing demodulation of quadrature modulated chroma into two baseband chroma components for separate noise reduction processing.

Such an inversion is not necessary if chrominance noise reduction is carried out following chroma demodulation, and if the two resultant chroma baseband components (e.g. R-Y and B-Y) are separately processed as depicted in the system 100 of FIG. 9. Therein, quadrature modulated chrominance enters a chroma demodulator circuit 102 operating at the chroma subcarrier frequency SC in order to separate a red minus luminance (R-Y) baseband chroma component and a blue minus luminance (B-Y) baseband chroma component. Each component is then passed through a noise reducer 10 of the type depicted in FIG. 1.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A noise reduction system for reducing random noise within a video signal for providing a picture image upon a television display, the system comprising:
   an input for receiving the video signal including transmission path noise and an output for putting out the video signal after removal of the transmission path noise,
   detail separation means connected to the input for separating low amplitude level picture detail components and the transmission path noise from the video signal,
   recirculation loop means connected for recirculating a fractional amount of the separated low amplitude level picture detail components and the transmission path noise, the fractional amount being controlled by a motion control signal in order to be higher when motion is lower and lower when motion is higher, so as to separate the transmission path noise from the low amplitude level picture detail components for non-motion portions of the picture image,
   combiner means for subtracting the separated transmission path noise from non-motion portions of the picture image of the video signal thereby to provide a first noise reduction mode, and
   coring means connected for coring in function of motion portions of the picture image of the video signal in accordance with the motion control signal; and,
   motion detection and control signal generation means connected to the input for generating the motion control signal as a function of detected motion in the picture image of the video signal.

2. The system set forth in claim 1 wherein the recirculation means comprises temporal domain recirculation means.

3. The system set forth in claim 2 wherein the temporal domain recirculation means includes a summing junction connected to receive the separated low amplitude level picture detail components and the transmission path noise, frame delay means connected to an output of the summing junction for delaying an output thereof by a period corresponding to a video frame, and multiplier means for multiplying the delayed output from the frame delay means by a function of the motion control signal.

4. The system set forth in claim 2 wherein the recirculation loop means comprises gain control circuit means for controlling the fractional amount of recirculation of the recirculation loop means.

5. The system set forth in claim 4 wherein the gain control circuit means is responsive to a one's complement of the motion control signal.

6. The system set forth in claim 1 further comprising noise extraction means connected to the detail separation means for separating noise from the low amplitude level picture components.

7. The system set forth in claim 6 wherein the coring means includes noise processor means connected to the transmission path noise extraction means for generating a noise control signal related to noise amplitude level, and coring control logic means for responding to the noise control signal and the motion control signal for limiting operation of the coring means upon portions of the picture image in motion to a level related to the noise control signal.

8. The system set forth in claim 7 wherein the noise processor means comprises full wave rectifier means connected for rectifying a signal including transmission path noise from the transmission path noise extraction means to provide an absolute value control signal, hold circuit means having a time constant of not less than about one second for holding the amplitude of the absolute value control signal, and low pass filter means for smoothing the held absolute value control signal to provide the noise control signal.

9. The system set forth in claim 1 wherein the motion detection and control signal generation means comprises temporal delay means for delaying an incoming component of the video signal at the input by a predetermined temporal domain period; and, comparision means for comparing the temporal domain delayed component with the incoming component in order to provide a detected motion signal as a difference therebetween.

10. The system set forth in claim 9 further comprising non-linear amplifier means for amplifying in a predetermined non-linear fashion the incoming component of the video signal and for supplying the non-linearly amplified incoming component to the temporal delay means and to the comparison means.

11. The system set forth in claim 9 wherein the comparison means comprises a summing junction and a full wave rectifier means.

12. The system set forth in claim 11 wherein the motion detection and control signal generation means further comprises low pass filter means for widening the detected motion signal, and threshold and limiter means following the low pass filter means for putting out the detected motion signal above a predetermined amplitude threshold and for limiting the detected motion signal to a predetermined maximum amplitude value.

13. The system set forth in claim 12 wherein the predetermined amplitude threshold is established in a range between 5 and 15 IRE units.

14. The system set forth in claim 12 wherein the predetermined maximum amplitude value is established at approximately 40 IRE units.

15. The system set forth in claim wherein the incoming video signal comprises a luminance component of a quadrature modulated color television picture signal.

16. The system set forth in claim 15 wherein the incoming luminance video component has been separated from the quadrature modulated color subcarrier television picture signal by comb filter signal separation processing.

17. The system set forth in claim wherein the incoming video signal comprises a chrominance component of a quadrature modulated color subcarrier television picture signal.

18. The system set forth in claim 17 wherein the incoming chrominance video component has been separated from the quadrature modulated color subcarrier television picture signal by comb filter signal separation processing.

19. A method for reducing transmission path noise within a video signal for providing a picture image upon a display, the method comprising the steps of:
 a. extracting low level picture details and the transmission path noise from the video signal,
 b. recirculating a fractional component of the extracted low level picture details and the transmission path noise,
 c. combining the recirculated fractional component with the extracted low level picture details and the transmission path noise to cancel the extracted low level picture details and thereby separate the transmission path noise,
 d. subtracting the separated transmission path noise from the video signal in the absence of motion of the picture image thereof in order to noise reduce non-moving portions of the picture image of the video signal, and
 e. selectively coring only the moving portions of the picture image of the video signal to noise reduce those moving portions,
 whereby noise is reduced in non-moving portions of the picture image by signal recirculation and is reduced in moving portions of the picture image by coring.

20. The method set forth in claim 19 comprising the further steps of detecting motion in the picture image of the video signal, generating therefrom a motion control signal from the picture image of the video signal, and controlling selectively the recirculation step and the coring step with the motion control signal.

21. The method set forth in claim 20 comprising the further steps of processing the separated transmission path noise into a noise control signal and controlling the coring step as a function of the presence of the noise control signal and the magnitude of the motion control signal.

22. The method set forth in claim 20 wherein the step of generating the motion control signal comprises the step of putting out a function of detected motion above a predetermined threshold to a predetermined maximum amplitude value and thereafter limiting the motion control signal to the maximum amplitude value.

23. The method set forth in claim 22 wherein the predetermined threshold is set at about 5 to 15 IRE units, and wherein the maximum amplitude value is approximately 40 IRE units.

24. The method set forth in claim 19 wherein the video signal comprises a luminance component of a quadrature modulated subcarrier color television signal.

25. The method set forth in claim 24 wherein the luminance component has been separated from the quadrature modulated subcarrier color television signal by the step of comb filter signal separation processing.

26. The method set forth in claim 19 wherein the video signal comprises a chrominance component of a quadrature modulated subcarrier color television signal.

27. The method set forth in claim 26 wherein the chrominance component has been separated from the quadarature modulated subcarrier color television signal by the step of comb filter signal separation processing.

28. The method set forth in claim 19 wherein the step of coring in the moving portions of the picture image is made proportional to noise level as measured in non-moving portions of the picture image.

29. The method set forth in claim 20 further comprising the steps of performing the noise reduction method in plural paths simultaneously upon luminance and chrominance components of a quadrature modulated subcarrier color television signal.

30. The method set forth in claim 29 wherein the motion control signal in a luminance component path and the motion control signal in a chrominance component path are combined to obtain a single motion control signal for controlling recirculation and coring steps of the method in each path.

31. The method set forth in claim 29 wherein the chrominance component of the quadrature modulated subcarrier color television signal is demodulated into plural baseband components and the noise reduction method is simultaneously carried out for each said component.

* * * * *